(12) United States Patent
Matsubara et al.

(10) Patent No.: US 8,820,943 B2
(45) Date of Patent: Sep. 2, 2014

(54) PROJECTION APPARATUS AND IMAGE DISPLAY APPARATUS HAVING A REFLECTOR AND AN OPTICAL SYSTEM WITH A CUT OFF PORTION

(75) Inventors: Takayuki Matsubara, Chino (JP); Masatoshi Yonekubo, Hana-mura (JP); Hidefumi Sakata, Tatsuno-cho (JP)

(73) Assignee: Seiko Epson Corporation, Tokyo (JP)

( * ) Notice: Subject to any disclaimer, the term of this patent is extended or adjusted under 35 U.S.C. 154(b) by 1011 days.

(21) Appl. No.: 12/391,718

(22) Filed: Feb. 24, 2009

(65) Prior Publication Data

US 2009/0244498 A1 Oct. 1, 2009

(30) Foreign Application Priority Data

Mar. 28, 2008 (JP) ................................. 2008-085836

(51) Int. Cl.
*G03B 21/28* (2006.01)

(52) U.S. Cl.
CPC ..................................... *G03B 21/28* (2013.01)
USPC .......................................................... 353/98

(58) Field of Classification Search
CPC ............................... G03B 21/28; G03B 21/30
USPC ..................................... 353/98; 359/726–731
See application file for complete search history.

(56) References Cited

U.S. PATENT DOCUMENTS

| 6,188,523 | B1 * | 2/2001 | Choi ............................... 359/649 |
| 6,471,359 | B1 * | 10/2002 | Kim et al. ....................... 353/122 |
| 6,937,401 | B2 | 8/2005 | Sugano |
| 7,789,516 | B2 | 9/2010 | Lee et al. |
| 2005/0024594 | A1 * | 2/2005 | Kumai .............................. 353/33 |
| 2007/0024983 | A1 | 2/2007 | Yamamoto |
| 2007/0253076 | A1 * | 11/2007 | Takaura et al. ................. 359/780 |

FOREIGN PATENT DOCUMENTS

| JP | A-55-17131 | 2/1980 |
| JP | A-57-186727 | 11/1982 |
| JP | A-11-327047 | 11/1999 |
| JP | 2001-042211 A | 2/2001 |
| JP | A-2001-042211 | 2/2001 |
| JP | A-2003-156683 | 5/2003 |
| JP | A-2007-094405 | 4/2007 |

* cited by examiner

*Primary Examiner* — Thanh Luu
*Assistant Examiner* — Danell L Owens
(74) *Attorney, Agent, or Firm* — Oliff PLC

(57) ABSTRACT

A projection apparatus includes a first optical system, an aperture disposed on the light exiting-side of the first optical system, a second optical system disposed on the light exiting-side of the aperture, and a reflector disposed on the optical path between the first optical system and the second optical system, the reflector having a reflection surface that reflects the light having exited from the first optical system toward the second optical system. The optical axis of the second optical system is disposed along the optical axis of the first optical system. The reflection surface of the reflector is disposed along the optical axis of the first optical system. At least part of the first and second optical systems that is on the side opposite the reflection surface of the reflector is cut off.

17 Claims, 4 Drawing Sheets

PROJECTION APPARATUS AND IMAGE DISPLAY APPARATUS HAVING A REFLECTOR AND AN OPTICAL SYSTEM WITH A CUT OFF PORTION

BACKGROUND

1. Technical Field

The present invention relates to a projection apparatus and an image display apparatus.

2. Related Art

As the development of projectors proceeds in recent years, there is a need for a projector that projects an image on a predetermined projection surface (a screen, for example) in the diagonally upward, downward, rightward, or leftward direction. As a method for diagonally projecting an image on a screen, it is conceivable to employ a configuration in which the optical axis of a projection lens is inclined to the central axis of incident light, a configuration in which a decentered focusing lens is used to deflect the light emitted from a light source toward a screen (see JP-A-11-327047, for example), and a configuration, as shown in FIG. 5, in which the optical axis O1 of a front lens group 201 is shifted from the central axis O3 of incident light.

In the projection apparatus described in JP-A-11-327047, the light emitted from a light source is incident on a cylindrical lens, and the light having exited from the cylindrical lens is collected by a collector lens. The collected light is focused by a decentered focusing lens in the area above the central axis of the light emitted from the light source, and projected by a projection lens. Using the decentered focusing lens to deflect the central axis of the light as described above allows an image to be diagonally projected without tilting the entire projection apparatus.

In the configuration shown in FIG. 5, the optical axis O1 of a front lens group 201 and the optical axis O2 of a rear lens group 202 are shifted from each other but parallel to each other, and the front lens group 201 is disposed in such a way that the central axis O3 of incident light is located, for example, below the optical axis O1 of the front lens group 201 in the plane of view. Therefore, the light incident from the area below the optical axis O1 of the front lens group 201 exits from the front lens group 201, and enters the area above the optical axis O2 of the rear lens group 202. The light having passed through the rear lens group 202 is projected toward the portion of a projected surface that is above the central axis O3, where the light was incident on the front lens group 201.

However, as described above, in the configuration in which a projection lens is inclined, the configuration described in JP-A-11-327047, and the configuration in which the front lens group and the rear lens group are disposed in such a way that the optical axes thereof are shifted from each other, the apparatus becomes thicker in the direction in which the projection lens is inclined, in the direction in which the optical axis is deflected, and in the direction in which the optical axes of the front lens group and the rear lens group are shifted, respectively. The overall apparatus thus disadvantageously becomes larger.

SUMMARY

An advantage of some aspects of the invention is to provide a thin projection apparatus capable of diagonally projecting light. Another advantage of some aspects of the invention is to provide an image display apparatus.

To achieve the above advantage, the invention provides the following aspects.

A projection apparatus according to an aspect of the invention includes a first optical system, an aperture disposed on the light exiting-side of the first optical system, a second optical system disposed on the light exiting-side of the aperture, and a reflector disposed on the optical path between the first optical system and the second optical system, the reflector having a reflection surface that reflects the light having exited from the first optical system toward the second optical system. The optical axis of the second optical system is disposed along the optical axis of the first optical system. The reflection surface of the reflector is disposed along the optical axis of the first optical system. At least part of the first and second optical systems that is on the side opposite the reflection surface of the reflector is cut off.

The projection apparatus according to this aspect of the invention includes the first optical system, the aperture disposed on the light exiting-side of the first optical system, and the second optical system disposed on the light exiting-side of the aperture and having the optical axis disposed along the optical axis of the first optical system, and at least part of the first and second optical systems that is on the side opposite the reflection surface of the reflector is cut off. The above configuration causes the light to be incident from the side opposite of the optical axis of the first optical system to the cut-off portion (from the upper side of the optical axis of the first optical system). Therefore, the light having passed through the first optical system and having been reflected off the reflection surface of the reflector passes through the second optical system and is projected toward a projected surface above the optical axis of the first optical system. The incident light passes through the first optical system, the reflector, and the second optical system but does not travel through the area on the back side of the reflector.

Since the reflection surface of the reflector is disposed in the vicinity of the optical axis of the first optical system, no light will be incident on part of the first and second optical systems of related art. In this aspect of the invention, a thin projection apparatus capable of diagonally projecting light can be provided because the above-mentioned portion is cut off.

In the projection apparatus according to this aspect of the invention, the reflector is preferably disposed in such a way that the optical axis of the first optical system is located on the reflection surface of the reflector.

When the reflection surface of the reflector is shifted from the optical axis of the first optical system and disposed closer to the central axis of the light, or when the reflection surface of the reflector is shifted from the optical axis of the first optical system and disposed away from the central axis of the light, part of the light having exited from the first optical system is not disadvantageously incident on the reflector, resulting in reduction in light usage efficiency.

In the projection apparatus according to this aspect of the invention, since the reflector is disposed in such a way that the optical axis of the first optical system is located on the reflection surface of the reflector, the light is used efficiently and the overall apparatus can be thin at the same time.

In the projection apparatus according to this aspect of the invention, the reflector is preferably disposed in the vicinity of the aperture.

Since the projection apparatus according to this aspect of the invention includes the aperture disposed on the optical path between the first optical system and the second optical system, the amount of light having exited from the first optical system can be adjusted. Further, disposing the reflector in the vicinity of the aperture allows the light having exited from the first optical system to be efficiently reflected toward the second optical system.

In the projection apparatus according to this aspect of the invention, the reflection surface of the reflector and the optical axis of the second optical system are angled with respect to the optical axis of the first optical system, and the reflection surface of the reflector and the optical axis of the second optical system are inclined in the substantially same direction.

In the projection apparatus according to this aspect of the invention, since the reflection surface of the reflector and the optical axis of the second optical system are inclined in the substantially same direction, the incident light can be projected in the diagonally upward, downward, rightward, or leftward direction. That is, tilting the reflector and the second optical system and adjusting the angle between the reflection surface of the reflector and the optical axis of the first optical system and the angle between the optical axis of the second optical system and the optical axis of the first optical system can change the projection angle at which the light is projected on a projected surface in accordance with applications.

In the projection apparatus according to this aspect of the invention, the reflection surface of the reflector preferably has a flat shape.

In the projection apparatus according to this aspect of the invention, since the reflection surface of the reflector has a simple flat shape, the reflector can be readily manufactured, resulting in cost reduction.

In the projection apparatus according to this aspect of the invention, the reflection surface of the reflector preferably has a convex or concave shape.

In the projection apparatus according to this aspect of the invention, since the reflection surface of the reflector has a convex or concave shape, the reflector can not only reflect the incident light but also have a lensing capability. Therefore, when the first and second optical systems are comprised of a plurality of lenses, the reflector can share part of the lensing capability of the plurality of lenses, whereby the number of lenses that form the first and second optical systems can be reduced. It is therefore possible to reduce the overall size of the apparatus. Further, since the reflector can be used to correct aberrations, it is possible to project a sharp image on a projected surface when the projection apparatus is used, for example, in an image display apparatus.

In the projection apparatus according to this aspect of the invention, the optical axis of the first optical system preferably extends along a system optical axis of the projection apparatus.

A projection apparatus according to another aspect of the invention includes a first optical system, an aperture disposed on the light exiting-side of the first optical system, a second optical system disposed on the light exiting-side of the aperture, and a reflector disposed on the optical path between the first optical system and the second optical system, the reflector having a reflection surface that reflects the light having exited from the first optical system toward the second optical system. The optical axis of the second optical system is angled with respect to the optical axis of the first optical system. The reflection surface of the reflector is angled with respect to the optical axis of the first optical system. The reflection surface of the reflector and the optical axis of the second optical system are inclined in the substantially same direction. At least part of the first and second optical systems that is on the side opposite the reflection surface of the reflector is cut off.

In the projection apparatus according to this aspect of the invention, since the reflection surface of the reflector and the optical axis of the second optical system are inclined in the substantially same direction, the incident light can be projected in the diagonally upward, downward, rightward, or leftward direction. That is, tilting the reflector and the second optical system and adjusting the angle between the reflection surface of the reflector and the optical axis of the first optical system and the angle between the optical axis of the second optical system and the optical axis of the first optical system can change the projection angle at which the light is projected on a projected surface in accordance with applications.

An image display apparatus according to an aspect of the invention includes a light source that emits light, a light modulator that modulates the light emitted from the light source in accordance with image information, and a projection apparatus that projects the light modulated by the light modulator on a projected surface. The projection apparatus includes a first optical system, an aperture disposed on the light exiting-side of the first optical system, a second optical system disposed on the light exiting-side of the aperture, and a reflector disposed on the optical path between the first optical system and the second optical system, the reflector having a reflection surface that reflects the light having exited from the first optical system toward the second optical system. The optical axis of the second optical system is disposed along the optical axis of the first optical system. The reflection surface of the reflector is disposed along the optical axis of the first optical system. At least part of the first and second optical systems that is on the side opposite the reflection surface of the reflector is cut off. The light having exited from the light modulator is incident on the opposite side of the optical axes of the first and second optical systems to the cut-off portion.

In the image display apparatus according to this aspect of the invention, the light emitted from the light source is incident on the light modulator. An image formed by the light modulator is projected through the projection apparatus. Since the thin projection apparatus is used as described above, it is possible to provide an image display apparatus capable of diagonally projecting an image and reducing the overall size of the apparatus at the same time.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of a projection apparatus and an image display apparatus according to some aspects of the invention will be described below with reference to the drawings. In the following drawings, each member is not drawn to scale as appropriate in order to show the member in a recognizable size.

Figure 1:
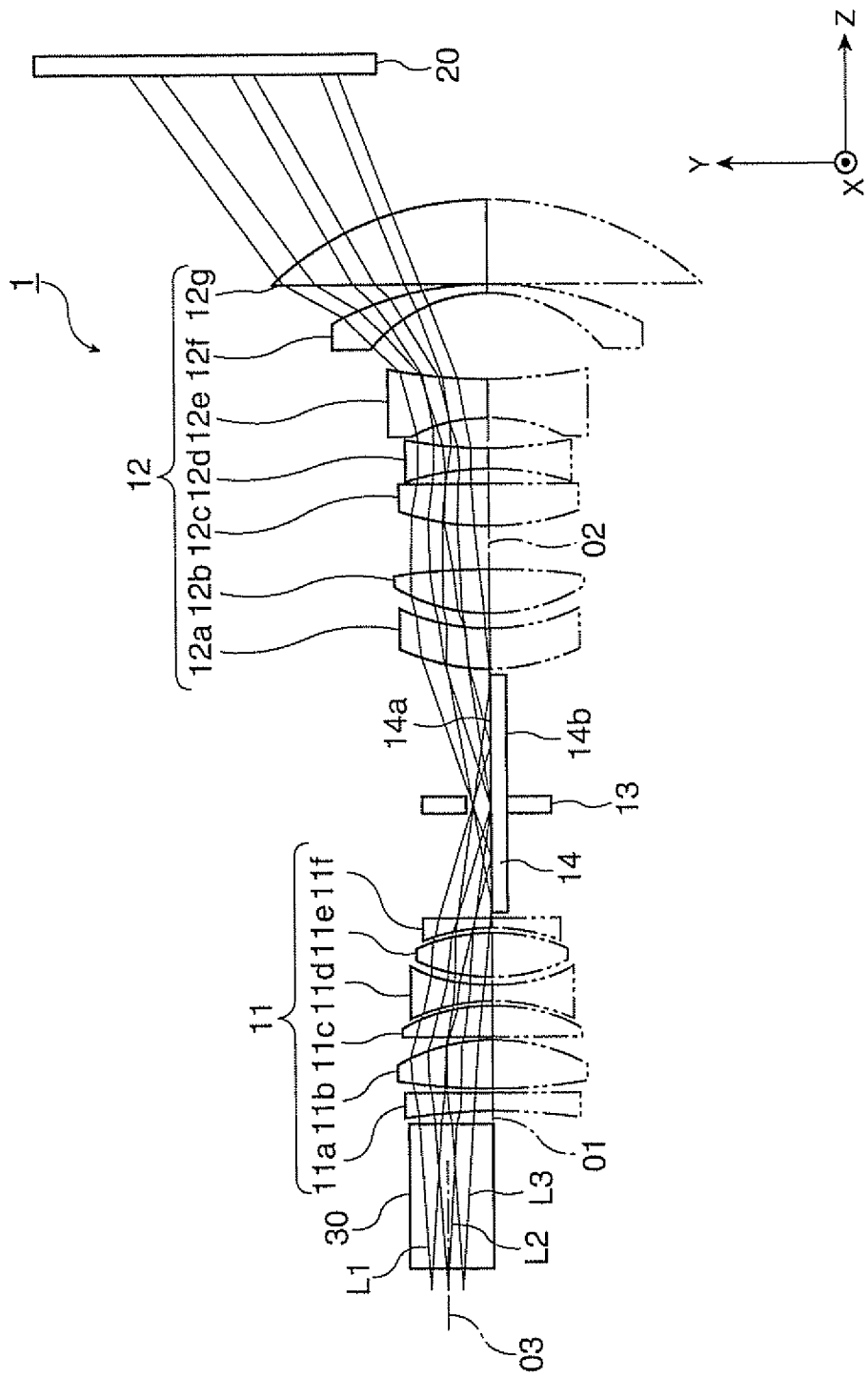
FIG. 1 is a plan view showing a projection apparatus according to a first embodiment of the invention.
Figure 2:
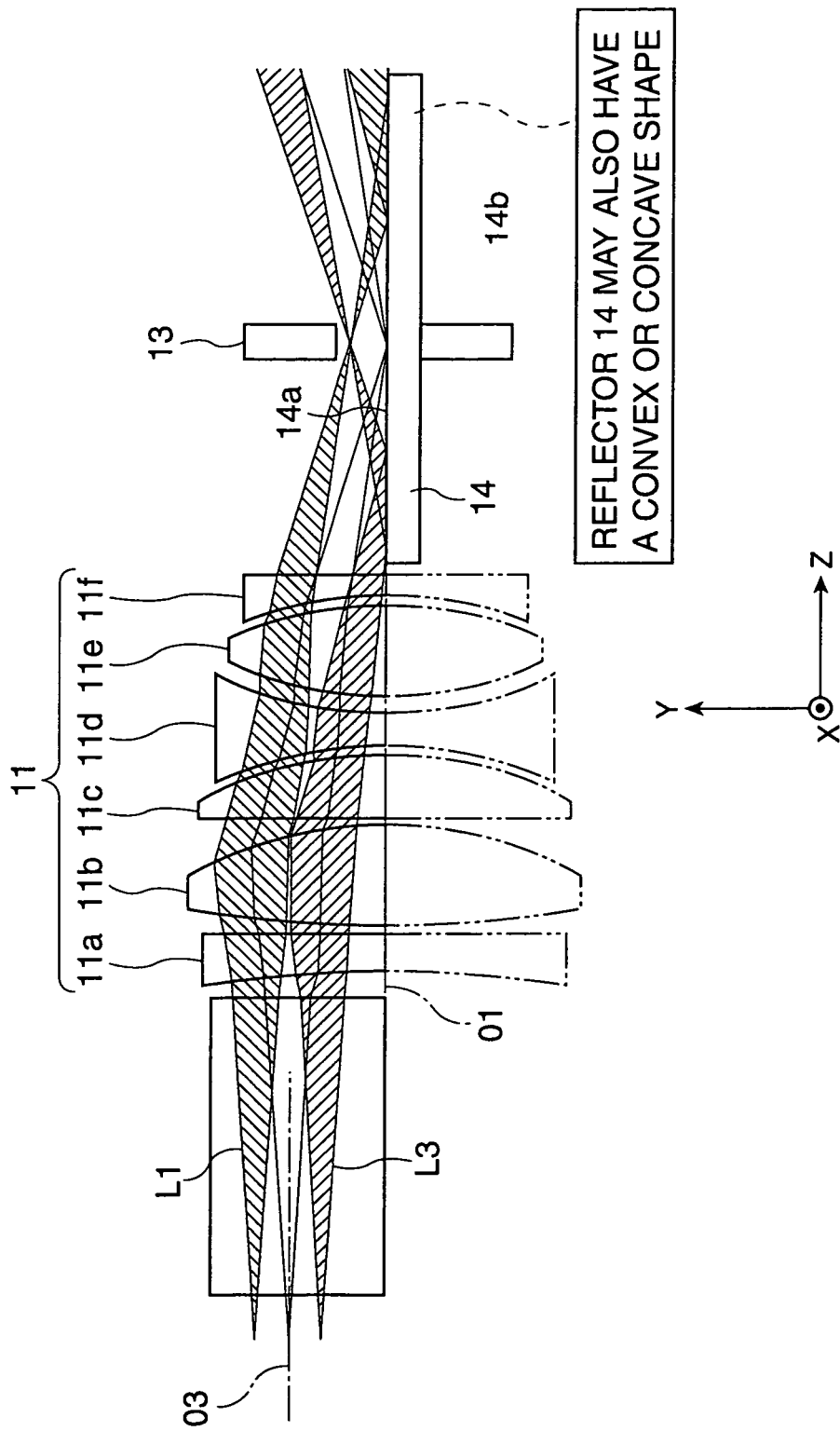
FIG. 2 is an enlarged plan view showing a first optical system of the projection apparatus shown in FIG. 1.

FIG. 1 is an overall view of the projection apparatus of the present embodiment, and FIG. 2 is an enlarged view of a first lens group, an aperture, and a reflector of the projection apparatus. In FIGS. 1 and 2, only three light rays, an upper ray L1, a principal ray L2, and a lower ray L3, are shown in order to make the description of the optical path of incident light easy to understand. The direction perpendicular to the plane of view is an X axis. The direction oriented upward in the plane of view is a Y axis. The direction in which light travels is a z axis.

First Embodiment

The projection apparatus 1 receives light having exited from, for example, a dichroic prism (color combining unit) 30 and projects the light on a screen (projected surface) 20, as shown in FIG. 1.

The projection apparatus 1 includes a first lens group (first optical system) 11, a second lens group (second optical system) 12, an aperture 13, and a reflector 14. The aperture 13 is disposed on the optical path between the first lens group 11 and the second lens group 12.

The projection apparatus 1 has a system optical axis, along which the optical axis O1 of the first lens group 11, the aperture 13, and the optical axis O2 of the second lens group 12 are disposed. In the present embodiment, the system optical axis coincides with the optical axis O1 of the first lens group 11 and the optical axis O2 of the second lens group 12.

The first lens group 11, which converts the incident light into an intermediate image in the vicinity of the aperture 13, includes a plano-concave lens 11a, a biconvex lens 11b, a plano-convex lens 11c, a biconcave lens 11d, a biconvex lens 11e, and a plano-concave lens 11f disposed along the optical path in this order from the side on which the light is incident.

The second lens group 12, which projects the intermediate image formed by the first lens group 11 on the screen 20, includes a convex meniscus lens 12a, a biconvex lens 12b, a plano-convex lens 12c, a biconcave lens 12d, a biconcave lens 12e, a concave meniscus lens 12f, and a plano-convex lens 12g disposed along the optical path in this order from the side on which the light is incident.

The first lens group 11 as a whole has a light-converging effect, and the second lens group 12 as a whole has a light-diverging effect. The second lens group 12 as a whole does not necessarily have a light-diverging effect, but may have a light-converging effect.

Half the first lens group 11 and the second lens group 12, which is indicated by the dash-dot-dot lines in FIG. 1 (the portion facing the ZX plane including the optical axes O1 and O2 and located on the rear surface 14b side of the reflector 14), is cut off, each of the lenses 11a to 11f and the lenses 12a to 12g used in the first lens group 11 and the second lens group 12 is half the normal one. Specifically, since the portions of the first lens group 11 and the second lens group 12 that are on the rear surface 14b side of the reflector 14 are cut off, the thickness in the direction perpendicular to the reflector 14 is half the size of related art (the size including the dash-dot-dot lines).

The shape, size, and number of the lenses 11a to 11f and 12a to 12g that form the first lens group 11 and the second lens group 12 as well as the intervals at which the lenses are disposed are not limited to those described above, but are changed as appropriate in accordance with required characteristics.

The optical axis O1 of the first lens group 11 coincides with the optical axis O2 of the second lens group 12. The first lens group 11 is disposed in such a way that the optical axis O1 of the first lens group 11 is shifted from the central axis O3 of the incident light. Specifically, the central axis O3 of the light is located above the optical axis O1 of the first lens group 11 in the plane of view. The light incident on the first lens group 11 thus passes through the area above the optical axis O1 of the first lens group 11.

The aperture 13 adjusts the amount of light having exited from the first lens group 11.

The reflector 14 has a flat shape and reflects the light having exited from the first lens group 11 toward the second lens group 12. The reflector 14 is disposed in the vicinity of the aperture 13, that is, in the aperture 13 on the optical path between the first lens group 11 and the second lens group 12. As shown in FIG. 2, which is the enlarged view, the reflector 14 is disposed in such a way that the optical axis O1 of the first lens group 11 is located on a reflection surface 14a of the reflector 14. Further, the reflector 14 is sized in such a way that the upper ray L1 and the lower ray L3 can be incident thereon, whereby all the light flux having exited from the first lens group 11 is incident on the reflector 14.

A description will be made of a method for projecting light on the screen 20 by using the thus configured projection apparatus 1 of the present embodiment.

The light having exited from the dichroic prism 30 passes through the area above the optical axis O1 of the lenses 11a to 11f of the first lens group 11, and is focused toward the optical axis O1 of the first lens group 11. The focused light forms an intermediate image in the vicinity of the aperture 13, which adjusts the amount of the light. The intermediate image is reflected off the reflector 14 and incident on the second lens group 12. The light having passed through the lenses 12a to 12g of the second lens group 12 is projected toward the portion of the screen 20 that is above the central axis O3, where the light was incident on the first lens group 11.

In the projection apparatus 1 according to the present embodiment, disposing the reflection surface 14a of the reflector 14 along the optical axis O1 of the first lens group 11 causes the light having exited from the first lens group 11 to be incident on the second lens group 12 but not to travel through the area below the ZX plane including the optical axis O1 of the first lens group 11 (the area on the side of the ZX plane including the optical axis O1 on which no light is incident). No light will thus be incident on part of the first lens group and second lens group of related art (the portions indicated by the dash-dot-dot lines shown in FIG. 1). In the present embodiment, an image can be diagonally projected and the projection apparatus is reduced in thickness at the same time because the above-mentioned portion is cut off.

If the reflection surface 14a of the reflector 14 is shifted from the optical axis O1 of the first lens group 11 and disposed closer to the central axis O3 of the light, the lower ray L3 of the light having exited from the first lens group 11 may be truncated by the reflector 14 or the aperture 13, resulting in reduction in light usage efficiency. Alternatively, if the reflection surface 14a of the reflector 14 is shifted from the optical axis O1 of the first lens group 11 and disposed away from the central axis O3 of the light, the lower ray L3 of the light having exited from the first lens group 11 may not be incident on the reflector 14, resulting in reduction in light usage efficiency.

In the projection apparatus 1 according to the present embodiment, since the reflector 14 is disposed in such a way that the optical axis O1 of the first lens group 11 is located on the reflection surface 14a of the reflector 14, the light is used efficiently and the overall apparatus can be thin at the same time.

Further, providing the aperture 13 allows the amount of light having exited from the first lens group 11 to be adjusted. Disposing the reflector 14 in the vicinity of the aperture 13 allows the light having exited from the first lens group 11 to be efficiently reflected toward the second lens group 12.

Moreover, since the reflection surface 14a of the reflector 14 has a simple flat shape, the reflector 14 can be readily manufactured, resulting in cost reduction.

The first lens group 11 and the second lens group 12 are not necessarily formed by cutting off half the lenses of related art, but can be formed by cutting off part of the first lens group 11 and the second lens group 12 on the side of the optical axes O1 and O2 of the first and second lens groups 11, 12 on which no light is incident.

Further, while the reflector 14 is not necessarily disposed in such a way that the optical axis O1 of the first lens group 11 is located on the reflection surface 14a, but may be disposed in such a way that the reflection surface 14a is located in the vicinity of the optical axis O1 of the first lens group 11. That is, the reflector 14 can be disposed in such a way that the reflection surface 14a is located above or below the optical axis O1 of the first lens group 11 depending on the performance of the first lens group 11 and the second lens group 12 as well as the diameter of the incident light beam. In this case as well, the reflector 14 may be disposed in any way as long as the upper ray L1 and the lower ray L3 can be incident on the reflector 14. That is, if part of the upper ray L1 and the lower ray L3 is not incident on the reflector 14, the projection apparatus used in an image display apparatus suffers from inefficient light usage and non-uniform luminance. When the reflector 14 is disposed below the optical axis O1 of the first lens group 11, enlarging the reflector 14 allows all the upper ray L1 and the lower ray L3 to be incident on the reflector 14. In this case, however, the large reflector 14 reduces the advantage of the thin projection apparatus 1.

The reflection surface 14a of the reflector 14 does not necessarily have a flat shape, but may have a convex or concave shape. In such a configuration, the reflector 14 can not only reflect the incident light but also have a lensing capability. The reflector 14 can therefore share part of the lensing capability of the plurality of lenses 11a to 11f and 12a to 12g that form the first and second lens groups 11, 12, whereby the number of lenses that form the first and second lens groups 11, 12 can be reduced. It is therefore possible to reduce the overall size of the apparatus. Further, when the shape of the reflector 14 is convex or concave, the reflector 14 can be used to correct aberrations. It is therefore possible to project a sharp image on the screen 20 when the projection apparatus 1 is used, for example, in an image display apparatus.

Further, while the description has been made of the configuration in which light is projected toward the screen 20 disposed above the ZX plane including the central axis O3, where the light was incident on the first lens group 11, a configuration for projecting light toward the screen 20 disposed below the ZX plane including the central axis O3 may be a symmetrical configuration comprised of the first lens group 11, the second lens group 12, the aperture 13, and the reflector 14 with respect to the optical axis O1 of the first lens group 11. When it is desired to project light toward the screen 20 disposed rightward or leftward from the central axis O3, the first lens group 11, the second lens group 12, the aperture 13, and the reflector 14 may be disposed in such a way that they are rotated by 90 degrees around the optical axis O1 of the first lens group 11.

Second Embodiment

A second embodiment according to the invention will be described with reference to FIG. 3. In the drawings with reference to which each of the following embodiments is described, the portions configured in the same way as in the projection apparatus 1 according to the first embodiment described above have the same reference characters and description of these portions will be omitted.

A projection apparatus 40 according to the present embodiment is similar to the projection apparatus of the first embodiment but differs therefrom in that the arrangement of the reflector 14 and the second lens group 12.

The projection apparatus 40 also has a system optical axis as in the first embodiment, and the optical axis O1 of the first lens group 11, the aperture 13, and the optical axis O2 of the second lens group 12 are disposed along the system optical axis. In the present embodiment, the system optical axis coincides with the optical axis O1 of the first lens group 11 and is inclined to the optical axis O2 of the second lens group 12 by an angle $\theta 2$.

Figure 3:
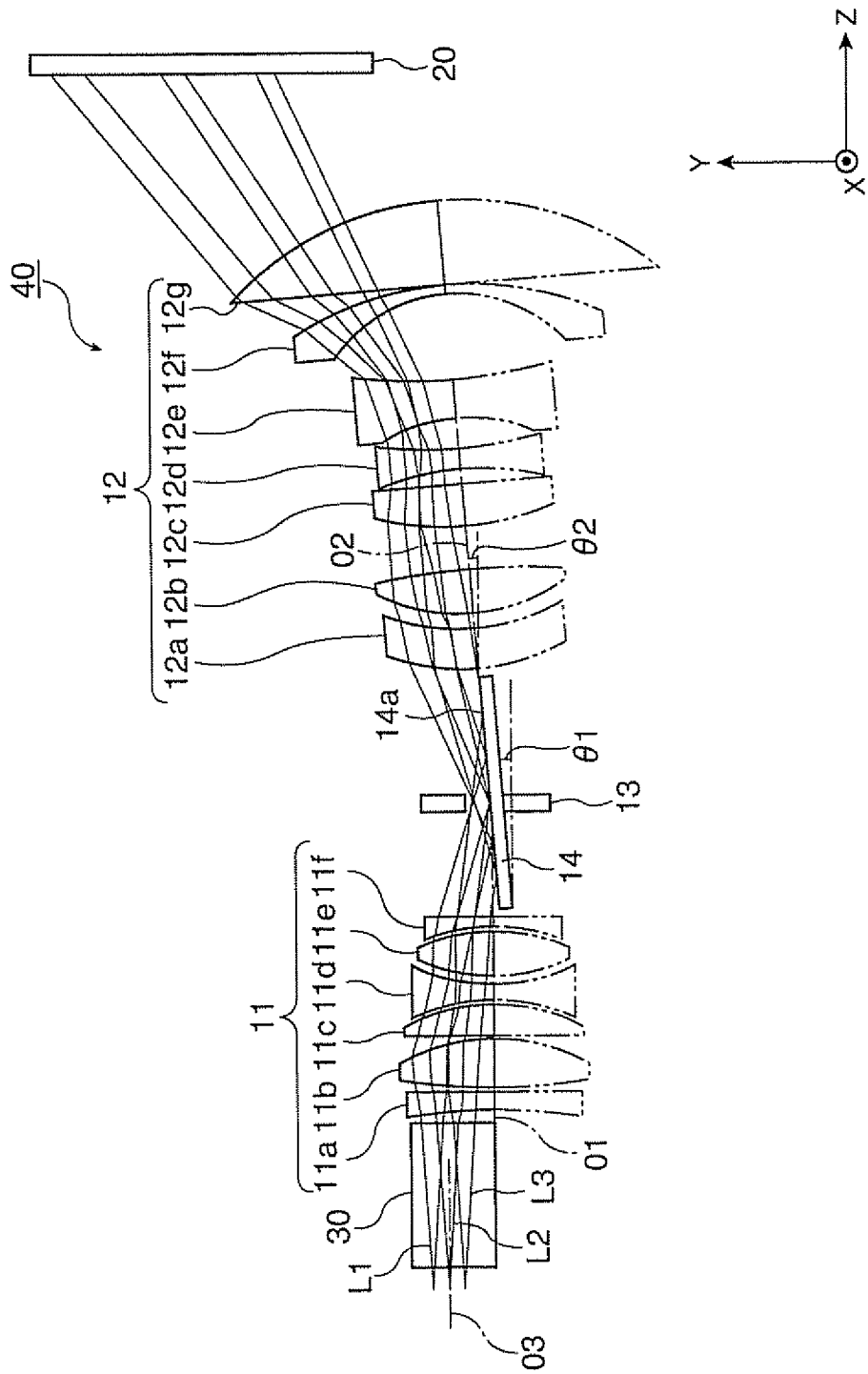
FIG. 3 is a plan view showing a projection apparatus according to a second embodiment of the invention.

The reflection surface 14a of the reflector 14 and the optical axis O2 of the second lens group 12 are inclined in the same direction, as shown in FIG. 3. Specifically, the reflector 14 and the second lens group 12 are inclined upward (in the Y-axis direction) from the ZX plane including the optical axis O1 of the first lens group 11, and the reflection surface 14a is inclined to the optical axis O1 of the first lens group 11 by an angle $\theta 1$, as shown in FIG. 3. Like the reflector 14, the optical axis O2 of the second lens group 12 is also inclined to the optical axis O1 of the first lens group 11 by the angle $\theta 2$, and the reflection surface 14a of the reflector 14 coincides with the ZX plane including the optical axis O2 of the second lens group 12. That is, the angle $\theta 1$ is equal to the angle $\theta 2$.

Since the reflector 14 is sized in such a way that the upper ray L1 and the lower ray L3 can be incident thereon as in the first embodiment, all the light flux having exited from the first lens group 11 is incident on the reflector 14.

A description will be made of a method for projecting light on the screen 20 by using the thus configured projection apparatus 40 of the present embodiment.

The light having exited from the dichroic prism 30 passes through the area above the optical axis O1 of the lenses 11a to 11f of the first lens group 11, and is reflected off the reflector 14, as in the first embodiment. Since the reflector 14 is inclined, the light is reflected off the reflector 14 further upward and incident on the second lens group 12. The light having passed through the lenses 12a to 12g of the second lens group 12 exits further upward than the light having exited from the second lens group 12 in the first embodiment does, and is projected toward the screen 20.

Since in the projection apparatus 40 according to the present embodiment, the reflection surface 14a of the reflector 14 and the optical axis O2 of the second lens group 12 are inclined in the same direction, the incident light can be projected further upward. That is, tilting the reflector 14 and the second lens group 12 and adjusting the angles $\theta 1$ and $\theta 2$ can change the projection angle at which the light is projected on the screen 20 in accordance with applications.

Since the reflector 14 and the second lens group 12 are inclined in such a way that the angle $\theta 1$ is equal to the angle $\theta 2$, image distortion and other problems can be eliminated when the projection apparatus 40 is used in an image display apparatus. However, the angle $\theta 1$ may slightly differ from the angle $\theta 2$ depending on the performance of the second lens group 12 and the diameter of the incident light beam.

Third Embodiment

Figure 4:
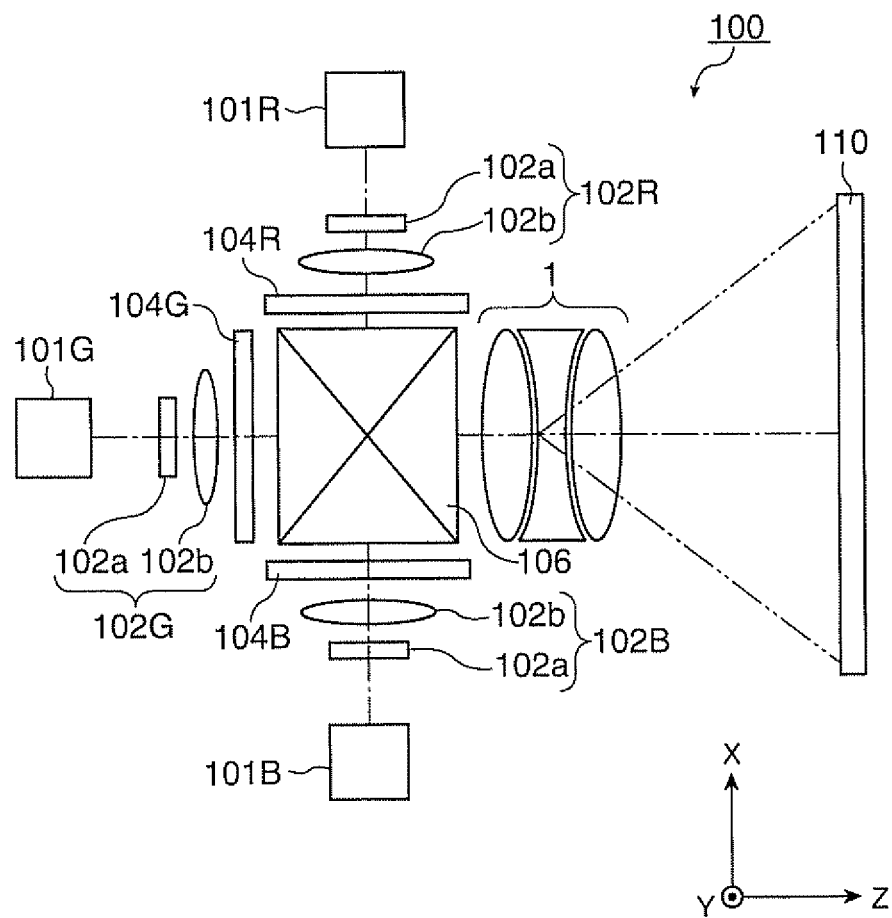
FIG. 4 is a plan view showing an image display apparatus according to a third embodiment of the invention.
Figure 5:
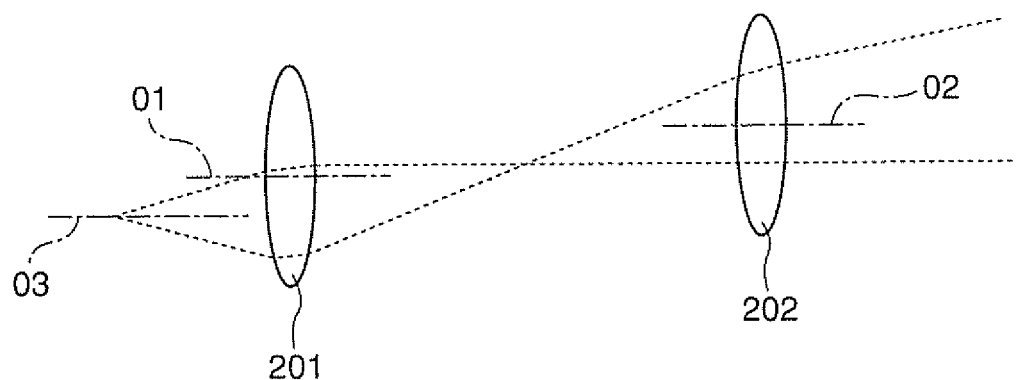
FIG. 5 is a plan view showing a projection apparatus of related art.

A third embodiment of the invention will be described below with reference to FIG. 4.

In the present embodiment, a projector including the projection apparatus 1 of the first embodiment described above will be described. FIG. 4 is a schematic configuration diagram of the projector of the present embodiment. The X axis is oriented upward in the plane of view. The Y axis is oriented in the direction perpendicular to the plane of view. The z axis is oriented in the direction in which the light travels from the projection apparatus 1 toward a screen 110.

The projector (image display apparatus) 100 of the present embodiment includes a red laser light source apparatus 101R that emits red light, a green laser light source apparatus 101G that emits green light, and a blue laser light source apparatus 101B that emits blue light.

The projector 100 further includes transmissive liquid crystal light valves (light modulators) 104R, 104G, and 104B that modulate the color light beams emitted from the laser light source apparatus 101R, 101G, and 101B, a cross dichroic prism (color combining unit) 106 that combines the light beams having exited from the liquid crystal light valves 104R, 104G, and 104B and guides the combined light to a projection lens 107, and the projection lens (projecting unit) 107 that enlarges an image formed by the liquid crystal light valves 104R, 104G, and 104B and projects the enlarged image on the screen 110.

In the present embodiment, the light having exited from the liquid crystal light valves 104R, 104G, and 104B is incident on the opposite side of the optical axes O1 and O2 of the first and second lens groups 11, 12 in the projection apparatus 1 shown in FIG. 1 to the cut-off portion, that is, the area above the ZX plane including the optical axis O1.

The projector 100 further includes homogenizing systems 102R, 102G, and 102B that homogenize the illuminance distributions of the laser light beams emitted from the laser light source apparatus 101R, 101G, and 101B, and the light beams with homogenized illuminance distributions illuminate the liquid crystal light valves 104R, 104G, and 104B. In the present embodiment, each of the homogenizing systems 102R, 102G, and 102B is comprised of, for example, a hologram 102a and a field lens 102b.

The three color light beams modulated by the liquid crystal light valves 104R, 104G, and 104B are incident on the cross dichroic prism 106. The prism is formed by bonding four rectangular prisms and thus has internal surfaces that intersect each other. One of the internal surfaces has a dielectric multilayer film that reflects red light, and the other internal surface has a dielectric multilayer film that reflects blue light. The dielectric multilayer films combine the three color light beams into light representing a color image. The combined light is then projected through the projection lens 107, which is a projection system, onto the screen 110 to display an enlarged image.

Since the projection apparatus 1 of the first embodiment described above is used in the projector 100 of the present embodiment, it is possible to diagonally project an image and reduce the size of the projector at the same time.

While a transmissive liquid crystal light valve is used as the light modulator, a reflective light valve or a non-liquid-crystal-based light modulator may be used. Examples of such a light valve include a reflective liquid crystal light valve and a digital micromirror device. The configuration of the projection system may be changed as appropriate in accordance with the type of the light valve used. The light source is not necessarily a laser, but can be an LED, a high-pressure mercury lamp, or any other suitable light source. The light valves are not necessarily illuminated with respective light sources, but a light source that emits white light may be used along with a color separation system for color separation, and the separated light beams may be incident on the respective light valves. That is, the configuration of the projector is not limited to that shown in FIG. 4 or any specific configuration, but the invention is applicable to any projector using a projection apparatus.

While the description has been made with reference to the projector 100 using the projection apparatus 1 of the first embodiment, the projector may use the projection apparatus 40 of the second embodiment.

The technical extent of the invention is not limited to the above embodiments, but a variety of changes can be made thereto to the extent that these changes do not depart from the spirit of the invention.

For example, a cross dichroic prism is not necessarily used as the color beam combining unit. As the color light combining unit, for example, dichroic mirrors may be disposed to be inclined to one another so that color light beams are combined, or dichroic mirrors are disposed to be parallel to one another so that color light beams are combined.

The entire disclosure of Japanese Patent Application No. 2008-85836, filed Mar. 28, 2008 is expressly incorporated by reference herein.

What is claimed is:

1. A projection apparatus comprising:
a first optical system including first lenses;
an aperture disposed on the light exiting-side of the first optical system;
a second optical system including second lenses, the second optical system being disposed on the light exiting-side of the aperture; and
a reflector disposed on the optical path between the first optical system and the second optical system, the reflector having a reflection surface that reflects projection light having exited from the first optical system toward the second optical system,
wherein the optical axis of the second optical system is disposed along the optical axis of the first optical system,
the first optical system as a whole has a light-converging effect,
the reflection surface of the reflector is disposed along the optical axis of the first optical system, and
in at least part of the first lenses and in at least part of the second lenses, a surface of the lenses that is located at a side opposite to the reflection surface of the reflector is cut off from the projection light.

2. The projection apparatus according to claim 1, wherein the reflector is disposed in such a way that the optical axis of the first optical system is located on the reflection surface of the reflector.

3. The projection apparatus according to claim 1, wherein the reflector is disposed in the vicinity of the aperture.

4. The projection apparatus according to claim 1, wherein the reflection surface of the reflector and the optical axis of the second optical system are angled with respect to the optical axis of the first optical system, and the reflection surface of the reflector and the optical axis of the second optical system are inclined in the substantially same direction.

5. The projection apparatus according to claim 1, wherein the reflection surface of the reflector has a flat shape.

6. The projection apparatus according to claim 1, wherein the reflection surface of the reflector has a convex or concave shape.

7. The projection apparatus according to claim 1,
wherein the optical axis of the first optical system extends along a system optical axis of the projection apparatus.

8. A projection apparatus comprising:
a first optical system including first lenses;
an aperture disposed on the light exiting-side of the first optical system;
a second optical system including second lenses, the second optical system being disposed on the light exiting-side of the aperture; and
a reflector disposed on the optical path between the first optical system and the second optical system, the reflector having a reflection surface that reflects projection light having exited from the first optical system toward the second optical system,
wherein the optical axis of the second optical system is angled with respect to the optical axis of the first optical system,
the reflection surface of the reflector is angled with respect to the optical axis of the first optical system,
the reflection surface of the reflector and the optical axis of the second optical system are inclined in the substantially same direction, and
in at least part of the first lenses and in at least part of the second lenses, a surface that is located at a side opposite to the reflection surface of the reflector is cut off from the projection light.

9. The projection apparatus according to claim 8,
wherein the reflector is disposed in the vicinity of the aperture.

10. The projection apparatus according to claim 8,
wherein the reflection surface of the reflector has a flat shape.

11. The projection apparatus according to claim 8,
wherein the reflection surface of the reflector has a convex or concave shape.

12. An image display apparatus comprising:
a light source that emits light;
a light modulator that modulates the light emitted from the light source in accordance with image information; and
a projection apparatus that projects the light modulated by the light modulator on a projected surface,
the projection apparatus including
a first optical system including first lenses,
an aperture disposed on the light exiting-side of the first optical system,
a second optical system including second lenses, the second optical system being disposed on the light exiting-side of the aperture, and
a reflector disposed on the optical path between the first optical system and the second optical system, the reflector having a reflection surface that reflects projection light having exited from the first optical system toward the second optical system,
wherein the optical axis of the second optical system is disposed along the optical axis of the first optical system,
the first optical system as a whole has a light-converging effect, the reflection surface of the reflector is disposed along the optical axis of the first optical system,
in at least part of the first lenses and in at least part of the second lenses, a surface of the lenses that is located at a side opposite to the reflection surface of the reflector is cut off from the projection light, and
the light having exited from the light modulator is incident on the opposite side of the optical axes of the first and second optical systems to the cut-off portion.

13. The image display apparatus according to claim 12,
wherein the reflector is disposed in such a way that the optical axis of the first optical system is located on the reflection surface of the reflector.

14. The image display apparatus according to claim 12,
wherein the reflector is disposed in the vicinity of the aperture.

15. The image display apparatus according to claim 12,
wherein the reflection surface of the reflector and the optical axis of the second optical system are angled with respect to the optical axis of the first optical system, and
the reflection surface of the reflector and the optical axis of the second optical system are inclined in the substantially same direction.

16. The image display apparatus according to claim 12,
wherein the optical axis of the first optical system extends along a system optical axis of the projection apparatus.

17. The projection apparatus according to claim 8,
wherein the first optical system as a whole has a light-converging effect.

\* \* \* \* \*